(12) United States Patent
Velilla et al.

(10) Patent No.: US 11,864,659 B2
(45) Date of Patent: Jan. 9, 2024

(54) SLEEP CONCIERGE

(71) Applicant: Dreamwell, Ltd., Doraville, GA (US)

(72) Inventors: John-David Velilla, Doraville, GA (US); Lisa Barclay DiBenedetto, Doraville, GA (US)

(73) Assignee: DREAMWELL, LTD., Doraville, GA (US)

( * ) Notice: Subject to any disclaimer, the term of this patent is extended or adjusted under 35 U.S.C. 154(b) by 653 days.

(21) Appl. No.: 17/012,616

(22) Filed: Sep. 4, 2020

(65) Prior Publication Data

US 2021/0100367 A1    Apr. 8, 2021

Related U.S. Application Data

(60) Provisional application No. 62/910,772, filed on Oct. 4, 2019.

(51) Int. Cl.
| | |
|---|---|
| *G05B 19/042* | (2006.01) |
| *A47C 31/00* | (2006.01) |
| *G06Q 50/02* | (2012.01) |
| *G06Q 10/02* | (2012.01) |
| *A47C 20/04* | (2006.01) |
| *A47C 21/04* | (2006.01) |
| *A47C 27/08* | (2006.01) |

(52) U.S. Cl.
CPC ............ *A47C 31/008* (2013.01); *A47C 20/04* (2013.01); *A47C 21/044* (2013.01); *G05B 19/042* (2013.01); *G06Q 10/02* (2013.01); *G06Q 50/02* (2013.01); *A47C 27/083* (2013.01); *G05B 2219/2608* (2013.01)

(58) Field of Classification Search
CPC ..... A47C 31/008; A47C 20/04; A47C 21/044; A47C 27/083; G05B 19/042; G05B 2219/2608; G05B 15/02; G05B 2219/2642; G06Q 10/02; G06Q 50/12
See application file for complete search history.

(56) References Cited

U.S. PATENT DOCUMENTS

| | | |
|---|---|---|
| 9,326,616 B2 | 5/2016 | Defranks et al. |
| 9,756,953 B2 | 9/2017 | Defranks et al. |
| 9,854,921 B2 | 1/2018 | Defranks et al. |
| 2005/0120478 A1 | 6/2005 | Hofmann |
| 2010/0231421 A1 | 9/2010 | Rawls-Meehan |
| 2013/0021143 A1 | 1/2013 | Collins, Jr. et al. |

(Continued)

FOREIGN PATENT DOCUMENTS

DE    202014009784 U1 *    5/2015    ........... A47C 27/082

OTHER PUBLICATIONS

Notification of Transmittal Of The International Search Report and The Written Opinion Of The International Searching Authority, Or The Declaration, issued in International Application No. PCT/US2020/052658 dated Dec. 18, 2020; 13 pages.

*Primary Examiner* — Michael W Choi
(74) *Attorney, Agent, or Firm* — CANTOR COLBURN LLP

(57) ABSTRACT

A sleep concierge system is provided and includes a bedding assembly configured to assume multiple configurations with multiple settings and a computing device. The computing device is configured to communicate with the bedding assembly and to control the bedding assembly to assume a selected configuration with selected settings in in accordance with user inputs in response to a predefined event.

17 Claims, 3 Drawing Sheets

(56) References Cited

U.S. PATENT DOCUMENTS

| | | |
|---|---|---|
| 2013/0025069 A1 | 1/2013 | Ruehlmann et al. |
| 2013/0025070 A1 | 1/2013 | Ruehlmann et al. |
| 2014/0052974 A1 | 2/2014 | Master et al. |
| 2014/0259431 A1 | 9/2014 | Fleury et al. |
| 2015/0282635 A1 | 10/2015 | Rawls-Meehan |
| 2015/0320230 A1 | 11/2015 | Creekmuir et al. |
| 2016/0270544 A1 | 9/2016 | Defranks et al. |
| 2016/0276568 A1 | 9/2016 | Defranks et al. |
| 2016/0286972 A1 | 10/2016 | Defranks et al. |
| 2017/0112716 A1* | 4/2017 | Rawls-Meehan .......................... A61H 23/0263 |
| 2017/0318979 A1* | 11/2017 | Rawls-Meehan ...... A47C 27/14 |
| 2018/0125261 A1 | 5/2018 | Neudecker |
| 2018/0344046 A1 | 12/2018 | Defranks et al. |
| 2019/0174930 A1 | 6/2019 | Defranks et al. |
| 2019/0208918 A1 | 7/2019 | Defranks et al. |
| 2020/0028704 A1* | 1/2020 | Balasubramanian ... H04W 4/70 |

\* cited by examiner

SLEEP CONCIERGE

CROSS REFERENCE TO RELATED APPLICATIONS

This application is a non-provisional of and claims the benefit of U.S. Provisional patent application Ser. No. 62/910,772, filed Oct. 4, 2019, which is fully incorporated herein by reference in its entirety.

BACKGROUND

The following description relates to bedding and, more specifically, to a sleep concierge that is capable of controlling a bedding configuration according to another bedding configuration.

Whether it is viewed as high-value amenity or a "do not disturb-worthy" interruption, turndown service in a hotel has been a staple of luxury travel dating back to the 18th century, when the wealthy made long journeys across Europe as part of "Grand Tours." Whether a traveler was staying in a hotel or the cabin of a ship, butlers and maids ensured sleeping quarters and dressing areas were ready for use at bedtime. In the 19th century, the first luxury hotels offered the service for customers travelling alone.

Understanding the power of this evening extra "touch" on guest satisfaction, hotels in all categories are continuing to create unique turndown experiences, from spa bath options to gourmet snacks to unique nightcaps.

BRIEF DESCRIPTION

According to an aspect of the disclosure, a sleep concierge system is provided and includes a bedding assembly configured to assume multiple configurations with multiple settings and a computing device. The computing device is configured to communicate with the bedding assembly and to control the bedding assembly to assume a selected configuration with selected settings in in accordance with user inputs in response to a predefined event.

In accordance with additional or alternative embodiments, the bedding assembly is located in a hotel room occupied by a user and the predefined event occurs when the user checks into a hotel in which the hotel room is located.

In accordance with additional or alternative embodiments, the computing device is configured to control the bedding assembly to assume an adjusted configuration with adjusted settings in accordance with further user inputs.

In accordance with additional or alternative embodiments, the computing device includes a portable computing device.

In accordance with additional or alternative embodiments, the bedding assembly includes a smart mattress and the smart mattress includes one or more of mechanical configuration systems to elevate and lower portions of the smart mattress in accordance with the user inputs, softness controlling systems to adjust a softness of various portions of the smart mattress in accordance with the user inputs and airflow generating systems to generate an airflow through the smart mattress in accordance with the user inputs.

In accordance with additional or alternative embodiments, the bedding assembly includes a simple mattress and at least one of a mattress support element and a topper and the at least one of the mattress support element and the topper includes one or more of mechanical configuration systems to elevate and lower a sleep surface in accordance with the user inputs, softness controlling systems to adjust a softness of various portions of the sleep surface in accordance with the user inputs and airflow generating systems to generate an airflow through the sleep surface in accordance with the user inputs.

According to another aspect of the disclosure, a sleep concierge system is provided and includes a computing device and first and second bedding assemblies respectively configured to assume multiple configurations with multiple settings. The first bedding assembly is configured to assume a selected configuration with selected settings in accordance with user inputs. The computing device is configured to communicate with the first and second bedding assemblies, to recognize that the first bedding assembly is configured to assume the selected configuration with the selected settings and to control the second bedding assembly to assume the selected configuration with the selected settings in response to a predefined event.

In accordance with additional or alternative embodiments, the first and second bedding assemblies are remote from one another.

In accordance with additional or alternative embodiments, the first bedding assembly is located in a home of a user and the second bedding assembly is located in a hotel room occupied by the user and the predefined event occurs when the user checks into a hotel in which the hotel room is located.

In accordance with additional or alternative embodiments, the computing device is configured to control the second bedding assembly to assume an adjusted configuration with adjusted settings in accordance with further user inputs.

In accordance with additional or alternative embodiments, the computing device includes a portable computing device.

In accordance with additional or alternative embodiments, at least one or both of the first and second bedding assemblies includes a smart mattress and the smart mattress includes one or more of mechanical configuration systems to elevate and lower portions of the smart mattress in accordance with the user inputs, softness controlling systems to adjust a softness of various portions of the smart mattress in accordance with the user inputs and airflow generating systems to generate an airflow through the smart mattress in accordance with the user inputs.

In accordance with additional or alternative embodiments, at least one or both of the first and second bedding assemblies includes a simple mattress and at least one of a mattress support element and a topper and the at least one of the mattress support element and the topper includes one or more of mechanical configuration systems to elevate and lower portions of a sleep surface in accordance with the user inputs, softness controlling systems to adjust a softness of various portions of the sleep surface in accordance with the user inputs and airflow generating systems to generate an airflow through the sleep surface in accordance with the user inputs.

According to another aspect of the disclosure, a computer-implemented method of operating a sleep concierge system is provided and includes receiving user inputs relating to a configuration of a first bedding assembly, configuring the first bedding assembly to assume a selected configuration with selected settings in accordance with the user inputs, recognizing that the first bedding assembly is configured to assume the selected configuration with the selected settings and controlling a second bedding assembly to assume the selected configuration with the selected settings in response to a predefined event.

In accordance with additional or alternative embodiments, the first and second bedding assemblies are remote from one another.

In accordance with additional or alternative embodiments, the first bedding assembly is located in a home of a user and the second bedding assembly is located in a hotel room occupied by the user and the predefined event occurs when the user checks into a hotel in which the hotel room is located.

In accordance with additional or alternative embodiments, the method further includes receiving further user inputs and controlling the second bedding assembly to assume an adjusted configuration with adjusted settings in accordance with the further user inputs.

In accordance with additional or alternative embodiments, the user inputs are received via a portable computing device.

In accordance with additional or alternative embodiments, at least one or both of the first and second bedding assemblies includes a smart mattress and the smart mattress includes one or more of mechanical configuration systems to elevate and lower portions of the smart mattress in accordance with the user inputs, softness controlling systems to adjust a softness of various portions of the smart mattress in accordance with the user inputs and airflow generating systems to generate an airflow through the smart mattress in accordance with the user inputs.

In accordance with additional or alternative embodiments, at least one or both of the first and second bedding assemblies includes a simple mattress and at least one of a mattress support element and a topper and the at least one of the mattress support element and the topper includes one or more of mechanical configuration systems to elevate and lower portions of a sleep surface in accordance with the user inputs, softness controlling systems to adjust a softness of various portions of the sleep surface in accordance with the user inputs and airflow generating systems to generate an airflow through the sleep surface in accordance with the user inputs.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

Figure 1:
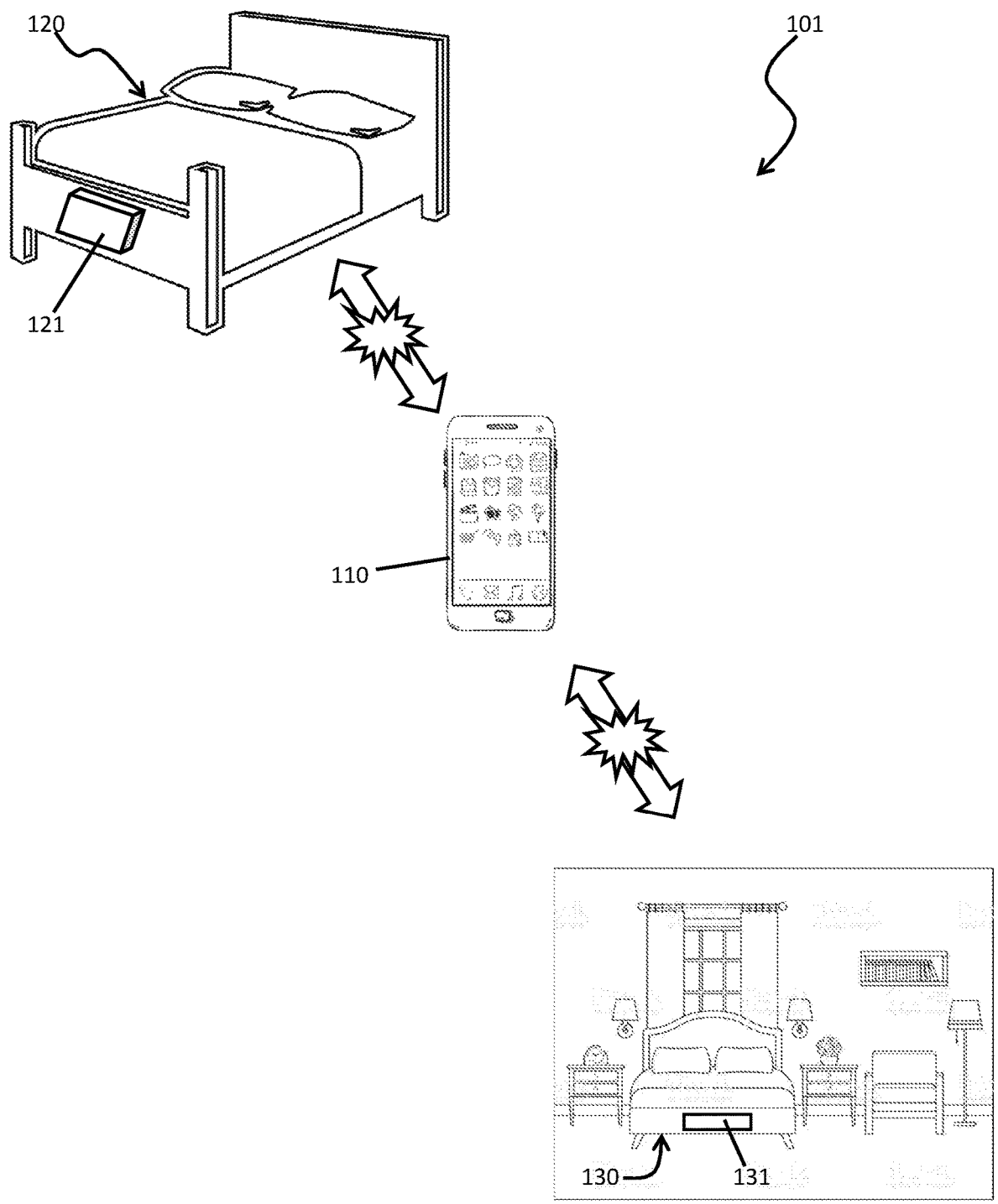
FIG. 1 is a schematic diagram of a sleep concierge system in accordance with embodiments.

These and other advantages and features will become more apparent from the following description taken in conjunction with the drawings.

DETAILED DESCRIPTION

Hotel turndown service should generally have a singular focus: to help guests experience the benefits of exactly what they are paying for. That is, a comfortable, restorative night's sleep. As will be described below, that experience can happen automatically by taking advantage of modern technology to seamlessly deliver a guest's preferred turndown amenities without any perceived intrusion from housekeeping staff.

In particular, a sleep sanctuary can be created and designed to deliver an exceptional night's rest. The experience could look like this:

A. At 9 pm, the temperature in the guest room drops to the ideal sleep temperature programmed using smart thermostat technology B. The lights in the room change to amber/red and automatically go to their dimmest setting C. The thermostat automatically turns on the fan to circulate cooler air to allow pulled back sheets to get cooler D. At 10 pm (or a time determined by the guest) two in-room smart noise masking machines turn on to create a noise blanket over the mattress E. Additional amenities like a sleep mask or lavender scented pillow spray are available next to the bed to promote relaxation F. If a guest wakes in the night to use the restroom, sensor technology could turn on dim floor lights to safely illuminate the way G. At 6 am (or time determined by the guest) the sound masking devices slowly shut off and drapes or window treatments change from room darkening to gently and slowly allowing natural blue light to filter into the room to rouse the guest from sleep A foundation of the sleep experience starts with investing in high-quality mattress technology, as it remains the heart of the guestroom and a key investment toward achieving your guest sleep experience goals. Bedding technology continues to evolve with the latest innovations relating to temperature management among others. For example, certain bedding can offer temperature control with antimicrobial features to absorb and wick away moisture. Foams can allow for the circulation of air, keeping heat from accumulating in the mattress and can provide pressure-relieving comfort and enhanced air flow. Foams can also cradle the body and balance sleep temperatures right at the sleep surface.

Additional features for improving the sleep experience relate to leveraging existing guest profiles and loyalty application such that hotels have the ability to create a virtual sleep concierge service to deliver a personalized experience with every stay. A platform could, for example, prompt guests to select from a menu of available amenities to promote relaxation and restful sleep upon making a reservation. This could include selecting a number and firmness of pillows, a type of linens, calming tea, pillow scents, sleep mask or noise masking devices. Desired preferences could be saved so that the room can be prepared with all selected amenities upon guest arrival. The application could also take advantage of near-field technology to immediately execute room temperature and lighting preference upon entering the guestroom. It could also be used to prompt reminders to select existing or new amenities. Sensor technology exists now for hotels to create a truly personalized, innovative guest sleep experience and reimagine a new brand-defining turndown service model.

Connected sleep technology and all its potential wellness benefits can also enhance the experience hotels offer. Smart devices, together with personalized amenities, can create an adaptive sleep environment that delivers the best sleep and recovery possible. Making that virtual, integrated turndown experience unique and memorable could not only improve guest satisfaction but strengthen loyalty. We believe it's time to put amenities that don't promote a restful night's sleep to bed.

As will be described below, a sleep concierge system is provided and includes a bedding assembly configured to assume multiple configurations with multiple settings and a computing device. The computing device is configured to communicate with the bedding assembly and to control the bedding assembly to assume a selected configuration with selected settings in in accordance with user inputs in response to a predefined event.

With reference to FIGS. 1, a sleep concierge system 101 is provided and includes a computing device 110, a first bedding assembly 120 and a second bedding assembly 130. The first bedding assembly 120 is configured to assume multiple configurations with multiple settings and the second bedding assembly 130 is similarly configured to assume multiple configurations with multiple settings. The multiple configurations can include, for example, various portions of a mattress being elevated or lowered and the multiple settings can include, for example, softness settings and settings that govern air flow being generated through a mattress. The first bedding assembly 120 can, for example, be located in a user's home and is configured to assume a selected configuration with selected settings in accordance with user inputs directly into the first bedding assembly 120 or the computing device 110. The second bedding assembly 130 can be remote from the first bedding assembly 120 and can, for example, be located in a hotel room. The computing device 110 can be provided as a fixed or portable computing device, such as a smartphone, and is configured to communicate with the first and second bedding assemblies 120 and 130, to recognize that the first bedding assembly 120 is configured to assume the selected configuration with the selected settings and to control the second bedding assembly 130 to assume the selected configuration with the selected settings or to closely approximate the selected configuration with the selected settings in response to a predefined event. In the case where the first bedding assembly 120 is located in the user's home and the second bedding assembly 130 is located in a hotel room, the predefined event can, for example, occur when the user checks into a hotel in which the hotel room is located.

Figure 2:
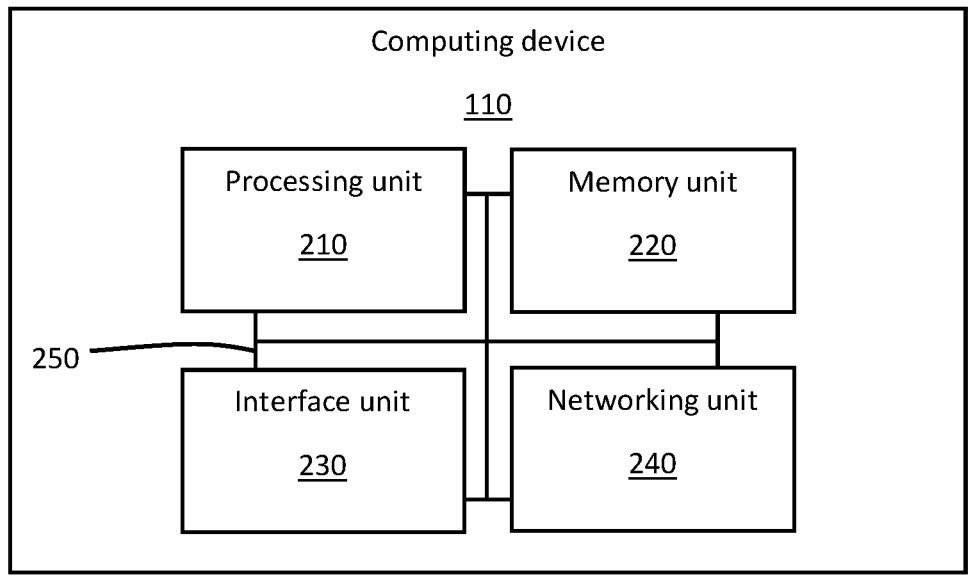
FIG. 2 is a schematic diagram of a computing device of the sleep concierge system of FIG. 1 in accordance with embodiments.

With continued reference to FIG. 1 and with additional reference to FIG. 2, the computing device 110 can include a processing unit 210, a memory unit 220, an interface 230, a networking unit 240 and a bus 250 by which the processing unit 210 is communicative with the memory unit 220, the interface 230 and the networking unit 240. The networking unit 240 allows for communications between the processing unit 210 and external elements, such as the first and second bedding assemblies 120 and 130 or respective controllers 121 and 131 thereof, via a network (see FIG. 1). The interface 230 allows for interaction between the processing unit 210 and a user whereby the interface 230 displays graphics and information to the user and permits the user to input commands and instructions to the processing unit 210. The memory unit 220 has executable instructions stored thereon, which are readable and executable by the processing unit 210. The executable instructions can be configured such that, when the executable instructions are read and executed by the processing unit 210, the executable instructions can cause the processing unit 210 to execute or run a sleep concierge application.

In accordance with embodiments, the sleep concierge application can be used by the user to select a configuration and settings for the first bedding assembly 120 (the configuration and settings of first bedding assembly 120 can also be selected by the user locally) and to control a configuration and settings of the second bedding assembly 130 following an occurrence of the predefined event (i.e., once the user checks into the hotel, the user is authorized to adjust the second bedding assembly 130).

In the exemplary case where the first bedding assembly 120 is located in the user's home and the second bedding assembly 130 is located in a hotel room and the predefined event occurs when the user checks into the hotel in which the hotel room is located, the computing device 110 of the sleep concierge system 101 of FIGS. 1 and 2 can recognize that the first bedding assembly 120 is configured to assume the selected configuration with the selected settings and can control the second bedding assembly 130 to assume the selected configuration with the selected settings or to closely approximate the selected configuration with the selected settings as a baseline instance. Subsequently, the user can be prompted by the computing device 110 running the sleep concierge application to make further inputs via the interface 230. Responsive to such further inputs, the computing device 110 can be configured to control the second bedding assembly 130 to assume an adjusted configuration with adjusted settings accordingly.

Figure 3:
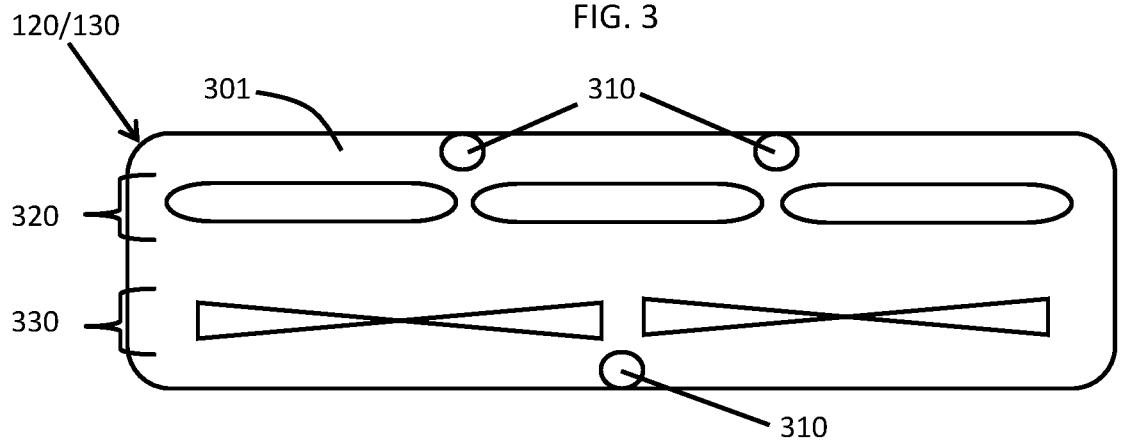
FIG. 3 is a schematic side view of a bedding assembly in accordance with embodiments.

With reference to FIG. 3, at least one or both of the first and second bedding assemblies 120 and 130 can include a smart or connected mattress 301 that is controllable locally or through the interface 230 of the computing device 110 of the sleep concierge system 101 of FIGS. 1 and 2. In accordance with various embodiments, the smart or connected mattress 301 includes one or more of mechanical configuration systems 310 to elevate and lower portions of the smart or connected mattress 301 in accordance with the user inputs, softness controlling systems 320, such as air or fluid bladders, to adjust a softness of various portions of the smart or connected mattress 301 in accordance with the user inputs and airflow generating systems 330, such as fans or blowers, to generate a cooling and dehumidifying airflow through the smart or connected mattress 301 in accordance with the user inputs.

It is to be understood that the mechanical configuration systems 310 affect the configuration of the first or the second bedding assemblies 120 or 130 and that the softness controlling systems 320 and the airflow generating systems 330 affect the settings of the first or the second bedding assemblies 120 or 130.

Figure 4:
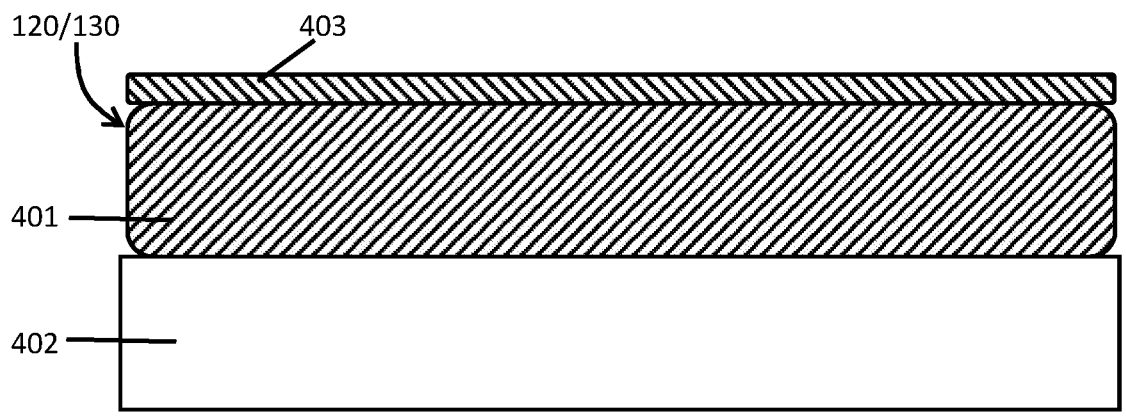
FIG. 4 is a schematic side view of aa bedding assembly in accordance with embodiments.

With reference to FIG. 4, at least one or both of the first and second bedding assemblies 120 and 130 can include a simple mattress 401 and at least one of a mattress support element 402, such as a box spring or a similar device that supports the simple mattress 401, and a topper 403 that is disposable on top of the simple mattress 401. In these or other cases, the mattress support element 402 and/or the topper 403 is controllable locally or through the interface 230 of the computing device 110 of the sleep concierge system 101 of FIGS. 1 and 2. In accordance with various embodiments, the mattress support element 402 and/or the topper 403 can include one or more of mechanical configuration systems, softness controlling systems and airflow generating systems (see FIG. 3 and the accompanying text). The simple mattress 401 can be configured for compatibility with the various operations of the features of the mattress support element 402 and/or the topper 403.

Figure 5:
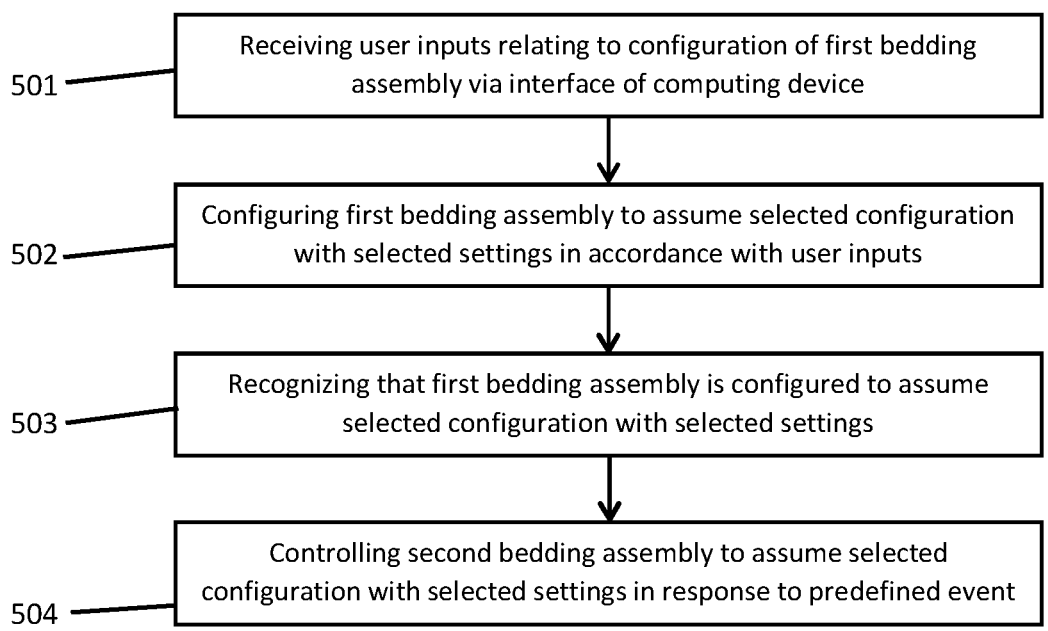
FIG. 5 is a flow diagram illustrating a method of operating a sleep concierge system in accordance with embodiments.

With continued reference to FIGS. 1-4 and with additional reference to FIG. 5, a computer-implemented method of operating a sleep concierge system is provided. As shown in FIG. 5, the computer-implemented method includes receiving user inputs relating to a configuration of the first bedding assembly 120 via the interface 230 of the computing device 110 (501), configuring the first bedding assembly 120 to assume a selected configuration with selected settings in accordance with the user inputs (502), recognizing by the processing unit 210 of the computing device 110 that the first bedding assembly 120 is configured to assume the selected configuration with the selected settings (503) and controlling by the processing unit 210 of the computing device 110 the second bedding assembly 130 to assume the selected configuration with the selected settings in response to a predefined event, such as the user checking into the hotel (504).

Technical effects and benefits of the present disclosure are the provision of connected sleep technology where all its potential wellness benefits enhances the experience hotels offer. Smart devices, together with personalized amenities, create an adaptive sleep environment that delivers the best sleep and recovery possible. Making that virtual, integrated turndown experience unique and memorable could not only improve guest satisfaction but strengthen loyalty.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A sleep concierge system, comprising:
    a first bedding assembly located in a home of a user and configured to assume multiple configurations with multiple settings;
    a second bedding assembly located in a hotel room of a hotel, which is to be occupied by the user, the second bedding assembly being configured to assume the multiple configurations with the multiple settings; and
    a computing device configured to communicate with the first and second bedding assemblies, to recognize that the first bedding assembly assumes a selected configuration of the multiple configurations with selected settings of the multiple settings in accordance with user inputs and to control the second bedding assembly to assume the selected configuration with the selected settings in accordance with the user inputs in response to the user checking into the hotel.

2. The sleep concierge system according to claim 1, wherein the computing device is configured to control the second bedding assembly to assume an adjusted configuration with adjusted settings in accordance with further user inputs.

3. The sleep concierge system according to claim 1, wherein the computing device comprises a portable computing device.

4. The sleep concierge system according to claim 1, wherein at least one of the first and second bedding assemblies comprises a smart mattress and the smart mattress comprises:
    mechanical configuration systems to elevate and lower portions of the smart mattress in accordance with the user inputs;
    softness controlling systems to adjust a softness of various portions of the smart mattress in accordance with the user inputs; and
    airflow generating systems to generate an airflow through the smart mattress in accordance with the user inputs.

5. The sleep concierge system according to claim 1, wherein at least one of the first and second bedding assemblies comprises a simple mattress and at least one of a mattress support element and a topper and the at least one of the mattress support element and the topper comprises:
    mechanical configuration systems to elevate and lower a sleep surface in accordance with the user inputs;
    softness controlling systems to adjust a softness of various portions of the sleep surface in accordance with the user inputs; and
    airflow generating systems to generate an airflow through the sleep surface in accordance with the user inputs.

6. A sleep concierge system, comprising:
    a computing device; and
    a first bedding assembly located in a home of a user and configured to assume multiple configurations with multiple settings;
    a second bedding assembly located in a hotel room of a hotel, which is to be occupied by the user, the second bedding assembly being configured to assume the multiple configurations with the multiple settings,
    wherein:
    the first bedding assembly assumes a selected configuration of the multiple configurations with selected settings of the multiple settings in accordance with user inputs, and the computing device is configured to communicate with the first and second bedding assemblies, to recognize that the first bedding assembly assumes the selected configuration with the selected settings and to control the second bedding assembly to assume the selected configuration of the multiple configurations with the selected settings of the multiple settings in response to the user checking into the hotel.

7. The sleep concierge system according to claim 6, wherein the first and second bedding assemblies are remote from one another.

8. The sleep concierge system according to claim 6, wherein the computing device is configured to control the second bedding assembly to assume an adjusted configuration with adjusted settings in accordance with further user inputs.

9. The sleep concierge system according to claim 6, wherein the computing device comprises a portable computing device.

10. The sleep concierge system according to claim 6, wherein at least one or both of the first and second bedding assemblies comprises a smart mattress and the smart mattress comprises:
    mechanical configuration systems to elevate and lower portions of the smart mattress in accordance with the user inputs;
    softness controlling systems to adjust a softness of various portions of the smart mattress in accordance with the user inputs; and
    airflow generating systems to generate an airflow through the smart mattress in accordance with the user inputs.

11. The sleep concierge system according to claim 6, wherein at least one or both of the first and second bedding assemblies comprises a simple mattress and at least one of a mattress support element and a topper and the at least one of the mattress support element and the topper comprises:

mechanical configuration systems to elevate and lower portions of a sleep surface in accordance with the user inputs;

softness controlling systems to adjust a softness of various portions of the sleep surface in accordance with the user inputs; and airflow generating systems to generate an airflow through the sleep surface in accordance with the user inputs.

12. A computer-implemented method of operating a sleep concierge system in which a first bedding assembly is located in a home of a user and is configured to assume multiple configurations with multiple settings and a second bedding assembly is located in a hotel room of a hotel, which is to be occupied by the user, and is configured to assume the multiple configurations with the multiple settings, the computer-implemented method comprising:

receiving user inputs relating to a configuration of a first bedding assembly in a home of a user;

configuring the first bedding assembly to assume a selected configuration of the multiple configurations with selected settings of the multiple settings in accordance with the user inputs;

recognizing that the first bedding assembly is configured to assume the selected configuration of the multiple configurations with the selected settings of the multiple settings; and controlling a second bedding assembly in a hotel room of a hotel, which is to be occupied by the user, to assume the selected configuration of the multiple configurations with the selected settings of the multiple settings in response to the user checking into the hotel.

13. The computer-implemented method according to claim 12, wherein the first and second bedding assemblies are remote from one another.

14. The computer-implemented method according to claim 12, further comprising:

receiving further user inputs; and controlling the second bedding assembly to assume an adjusted configuration with adjusted settings in accordance with the further user inputs.

15. The computer-implemented method according to claim 12, wherein the user inputs are received via a portable computing device.

16. The computer-implemented method according to claim 12, wherein at least one or both of the first and second bedding assemblies comprises a smart mattress and the smart mattress comprises:

mechanical configuration systems to elevate and lower portions of the smart mattress in accordance with the user inputs;

softness controlling systems to adjust a softness of various portions of the smart mattress in accordance with the user inputs; and airflow generating systems to generate an airflow through the smart mattress in accordance with the user inputs.

17. The computer-implemented method according to claim 12, wherein at least one or both of the first and second bedding assemblies comprises a simple mattress and at least one of a mattress support element and a topper and the at least one of the mattress support element and the topper comprises:

mechanical configuration systems to elevate and lower portions of a sleep surface in accordance with the user inputs;

softness controlling systems to adjust a softness of various portions of the sleep surface in accordance with the user inputs; and airflow generating systems to generate an airflow through the sleep surface in accordance with the user inputs.

* * * * *